United States Patent
Bali et al.

(10) Patent No.: US 7,603,453 B1
(45) Date of Patent: Oct. 13, 2009

(54) CREATING LINKS BETWEEN NODES CONNECTED TO A FIBRE CHANNEL (FC) FABRIC

(75) Inventors: Naveen Bali, Cary, NC (US); Ravi Budhia, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1009 days.

(21) Appl. No.: 10/692,669

(22) Filed: Oct. 24, 2003

(51) Int. Cl.
*G06F 15/173* (2006.01)

(52) U.S. Cl. .................. 709/223; 370/254; 370/355; 370/360; 370/389; 370/906

(58) Field of Classification Search .......... 370/230, 370/254, 401, 906, 355, 360, 389; 714/29, 714/6; 710/316, 33; 709/227, 215, 223; 711/148

See application file for complete search history.

(56) References Cited

U.S. PATENT DOCUMENTS

| | | | | |
|---|---|---|---|---|
| 5,748,612 | A * | 5/1998 | Stoevhase et al. | 370/230 |
| 6,199,112 | B1 * | 3/2001 | Wilson | 709/227 |
| 6,353,612 | B1 * | 3/2002 | Zhu et al. | 370/360 |
| 6,606,690 | B2 * | 8/2003 | Padovano | 711/148 |
| 6,625,747 | B1 * | 9/2003 | Tawil et al. | 714/6 |
| 6,763,417 | B2 * | 7/2004 | Paul et al. | 710/316 |
| 6,895,453 | B2 * | 5/2005 | Allen et al. | 710/33 |
| 6,980,525 | B2 * | 12/2005 | Banks et al. | 370/254 |
| 7,042,877 | B2 * | 5/2006 | Foster et al. | 370/389 |
| 7,124,324 | B1 * | 10/2006 | Au | 714/29 |
| 7,230,929 | B2 * | 6/2007 | Betker et al. | 370/254 |
| 7,362,717 | B1 * | 4/2008 | Betker | 370/254 |
| 7,386,608 | B2 * | 6/2008 | Tsai et al. | 709/223 |
| 2002/0191649 | A1 * | 12/2002 | Woodring | 370/906 |
| 2003/0091037 | A1 * | 5/2003 | Latif et al. | 370/355 |
| 2004/0010563 | A1 * | 1/2004 | Forte et al. | 709/215 |
| 2005/0036499 | A1 * | 2/2005 | Dutt et al. | 370/401 |

OTHER PUBLICATIONS

Kumar Malavalli et al.;Fibre Channel Generic Service-3 (FC-GS-3); NCITS working draft proposed American National Standard for Information Technology; Jan. 13, 2000; 178 pages.*

Kumar Malavalli et al.; "Fibre Channel Virtual Interface (FC-VI)"; Rev 1.6; NCITS working draft proposed American National Standard for Information Technology; Jul. 5, 2000; 112 pages.*

* cited by examiner

*Primary Examiner*—Dustin Nguyen
(74) *Attorney, Agent, or Firm*—Blakely, Sokoloff, Taylor & Zafman LLP (57) ABSTRACT

In one embodiment, the invention provides a method for establishing links between Fiber Channel (FC) protocol node devices through a FC fabric. In the method a common name is assigned to a pair of ports. Each port in the pair is located on first and second FC node devices, respectively. The common name-to-port assignment is then stored within a name server for the FC fabric. Each port in the pair of ports is configured to query the name server to establish an identity for the other port in the pair of ports based on the common name. The first and second FC node devices are configured to create a link between the pairs of ports that have been assigned a common name.

19 Claims, 9 Drawing Sheets

| Byte Number | Information Stored |
|---|---|
| 1 | version number |
| 2-21 | port type |
| 22-23 | slot number |
| 24-25 | subslot number |
| 26-255 | unused |

FIGURE 3

FC Commands

| Register FC-4 Types (RFT_ID) | Request to the Name Server to register protocols supported by the given port ID |
|---|---|
| Register Symbolic Port Name (RSPN_ID) | Request to the Name Server to associate a Symbolic Port Name with a given Port Identifier |
| Get Symbolic Port Name (GSPN_ID) | Query/request to the Name Server which when received by the Name Server causes the Name Server to return the registered Symbolic Port Name for the specified Port Identifier |
| Get Port Identifier(GID_FT) | Query/request to the Name Server which when received by the Name Server causes the Name Server to return the Port Identifiers that support the FCVI protocol |

FIGURE 4

NSDB Organization 500A

| Port ID | Symbolic Name | Protocol |
|---|---|---|
| HEX 101 | Storage Appliance 1 | FCVI |
| HEX 102 | Storage Appliance 2 | SCSI/FC |

CREATING LINKS BETWEEN NODES CONNECTED TO A FIBRE CHANNEL (FC) FABRIC

FIELD OF THE INVENTION

This invention relates to the storage of data. In particular, the invention relates to the storage of data using storage components connected by links that support the Fibre Channel (FC) protocol.

BACKGROUND

The Fibre Channel (FC) protocol enables high-speed point-to-point communications between storage devices through an intelligent collection of switches called a fabric. The storage devices may have one or more node devices called N_Ports which connect directly with ports on the fabric called Fabric Ports (F_Ports). The N_Ports discover each other through the fabric. Any two N_Ports may establish a link by a direct login procedure or a fabric login procedure. Each link is capable of supporting a base level protocol (the FC protocol) as well as one or more upper-level protocols (ULPs) such as the Small Computer Systems Interface (SCSI), the Internet Protocol (IP), the Virtual Interface (VI) Protocol (FCVI), etc. When running a ULP such as VI, a ULP connection must be established between a pair of ULP N_Ports before communication between the N_Ports can occur.

A ULP port e.g., a FCVI port (hereinafter called the "source port") must discover the port identifier (ID) of the corresponding FCVI port (hereinafter called the "login port") to which it wishes to send a connection request. This is achieved by querying a name server for the fabric to determine the IP address of the login port or by issuing a FARP (Fabric Address Resolution Protocol) request to all ports on the fabric. Both these techniques to discover the port ID of the login port require a network administrator to manually assign an IP address to the login port. Further, the network administrator has to configure the source port to use the IP address assigned to the login port to discover the port ID of the login port.

If a FARP request is the mechanism used to discover the port ID of the login port, then the source port issues a FARP request to all ports on the fabric. The FARP request includes the IP address of the login port. Each port on the fabric receives the FARP request and compares the IP address therein with its own IP address. Only the port with a matching IP address responds to the FARP request by providing its port ID to the source port.

However, as defined in the FC protocol, the FARP request is an optional service, and is not supported by all manufacturers. Further, manufacturers who provide equipment that supports FARP may require an additional license to use FARP.

Thus, it is desirable that the source and login ports can discover each other by themselves, without a network administrator having to assign IP addresses to the ports, and without the use of FARP requests.

SUMMARY OF THE INVENTION

In one embodiment, the invention provides a method for establishing links between Fibre Channel (FC) protocol node devices through a FC fabric. In the method a common name is assigned to a pair of ports. Each port in the pair is located on first and second FC node devices, respectively. The common name-to-port assignment is then stored within a name server for the FC fabric. Each port in the pair of ports is configured to query the name server to establish an identity for the other port in the pair of ports based on the common name. The first and second FC node devices are configured to create a link between the pairs of ports that have been assigned a common name.

Other aspects of the invention will be apparent from the accompanying figures and from the detailed description which follows.

DETAILED DESCRIPTION

The techniques described herein are applicable to any communications system that supports the Fibre Channel (FC) protocol.

In one embodiment, the invention provides a technique for a pair of FC ports connected to a FC fabric to automatically discover and login to each other. The technique does not require assignments of IP addresses to the FC ports by a network administrator. Further, the technique does not rely on the optional FARP service. Other advantages of the invention will become apparent from the description below.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
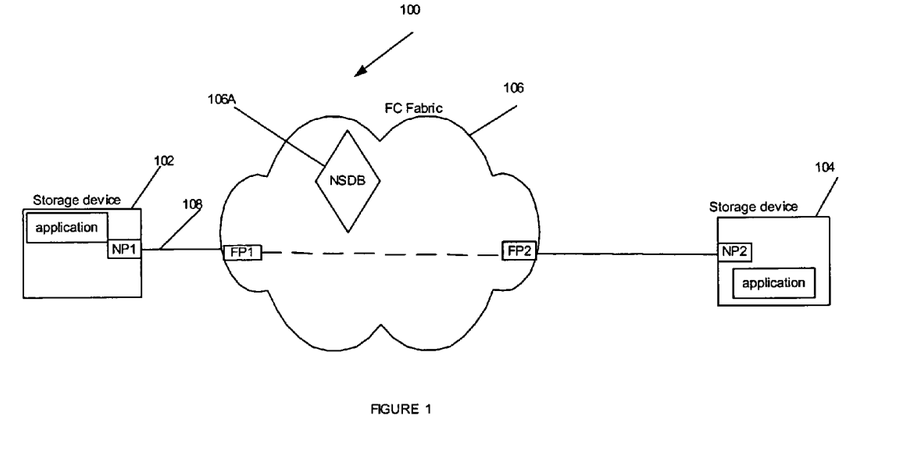
FIG. 1 shows a high-level block diagram of a Storage Area Network (SAN) within which embodiments of the present invention may be practiced.

FIG. 1 of the drawings shows a high-level block diagram of a Storage Area Network (SAN) 100, within which embodiments of the present invention may be practiced. The SAN 100 includes storage devices 102 and 104, which are connected to a Fibre Channel (FC) fabric 106. In particular, an N_Port NP1 of the storage device 102 is connected to an F_Port FP1 of the fabric 106, and an N_Port 102 of the storage device 104 is connected to an F_Port FP2 of the fabric 106. In addition to the storage devices 102 and 104 various other storage devices are connected to the fabric 106, but have not been shown. As will be seen, the fabric 106 includes a name server 106A within which a name server database (NSDB) for the FC fabric 106 is stored.

Embodiments of the techniques disclosed herein teach a discovery and login procedure performed by the machines 102 and 104 in order to establish a link 108 between the storage devices 102 and 104. The link 108 may support any type of upper-level protocol (ULP) which runs over the Fibre Channel (FC) protocol. For example, the ULP may include the Small Computer System Interface (SCSI) protocol, or the Virtual Interface (VI) known as FCVI, etc. For purposes of this description, it is assumed that the ULP is the FCVI protocol.

Figure 2:
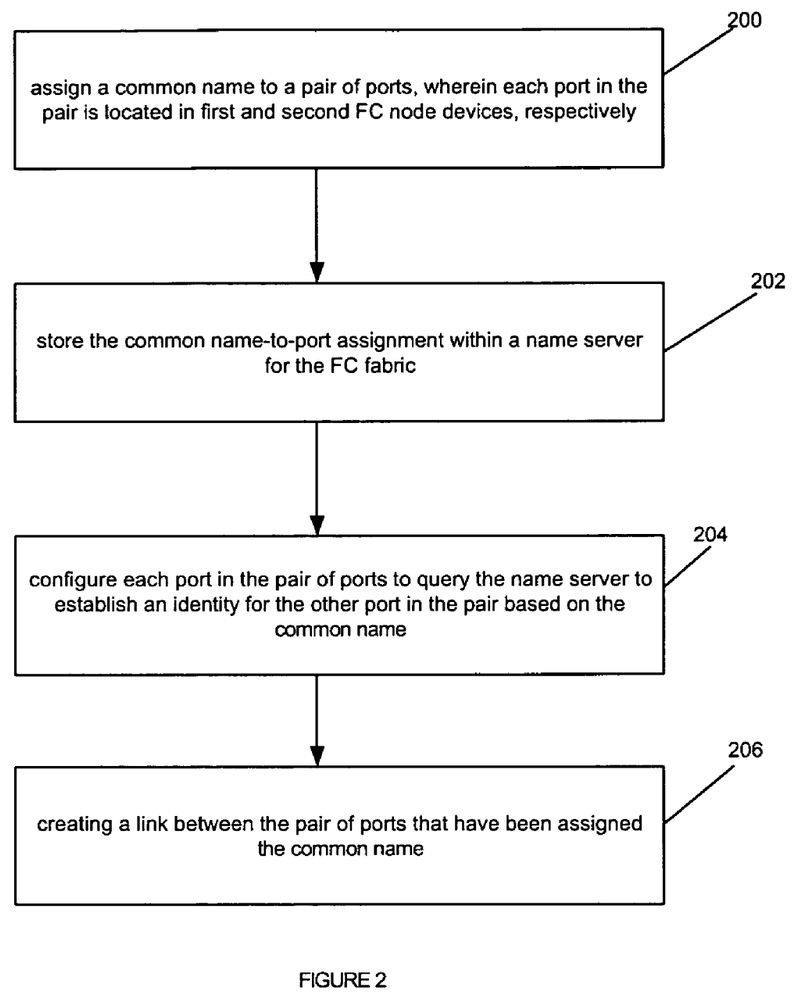
FIG. 2 shows a flowchart of operations performed in accordance with one embodiment of the invention.

In one embodiment, the method for establishing the FCVI link 108 between storage devices 102 and 104 includes the operations shown in FIG. 2 of the drawings. Referring to FIG. 2 at block 200, a common name is assigned to a pair of ports, wherein each port in the pair is located on first and second FC node devices, respectively. In FIG. 1 of the drawings, the port NP1 from the storage device 102, and the port NP2 from the storage device 104 define the pair of ports and are assigned a common name. In one embodiment, assigning the common name comprises automatically deriving the common name based on attributes of each of the ports NP1 and NP2. The attributes of a port that may be used to derive a common name for the port include a port type which specifies the type of ULP the port supports, a slot number for the port, which in one embodiment may be a Peripheral Component Interconnect (PCI) address defined in terms of a slot number, and a sub-slot number for the port. For example, the port NP1 of the storage device 102 may have the character string "NetApp-FCVI" assigned as its port type. This character string may be hard coded by a storage system vendor. Additionally, the port NP1 may have a PCI sub-slot number 5, and a PCI sub-slot number 2. Thus, in one embodiment, the common name for the port NP1 may be by the character string "NetApp-FCVI52".

Figure 3:
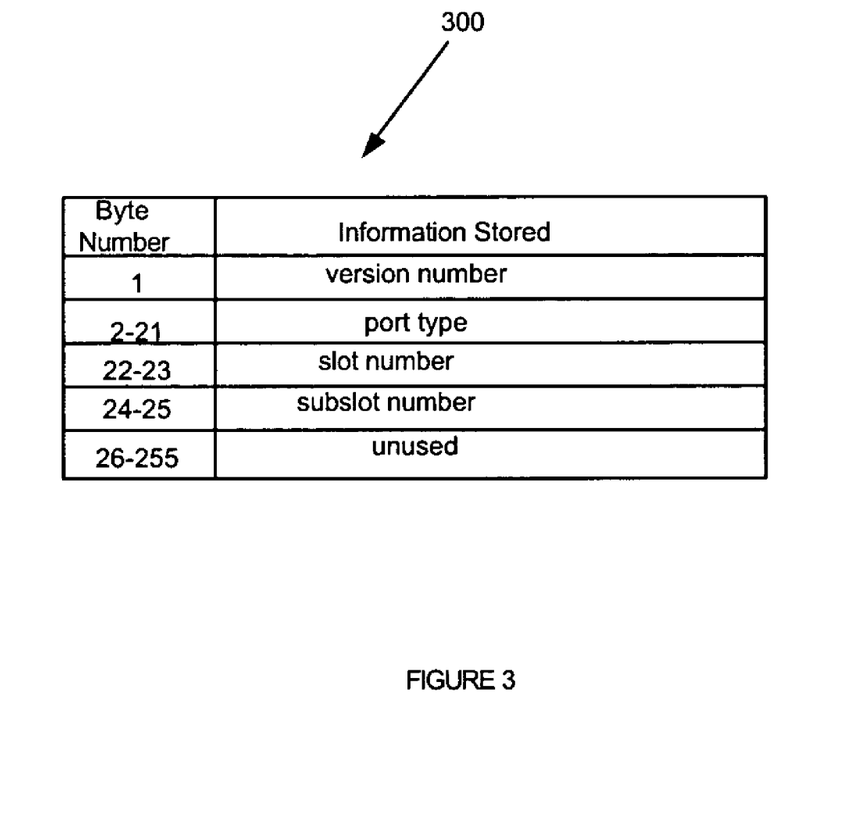
FIG. 3 shows an example of how the symbolic name field for a port may be structured in accordance with one embodiment of the present invention.

The operations performed at block 200, in FIG. 2, also include storing the common name within at least a portion of a symbolic name, as defined in the FC protocol, for each port. A symbolic name is a 0 to 255-byte-wide string which is used to assign a human-readable name to a port. In one embodiment, the present invention provides a technique for using predefined bytes of the symbolic name to store the above-described components of a port. FIG. 3 of the drawings shows an example of a symbolic name field 300, wherein predefined bytes of the symbolic name field are used to hold the above-described attributes of the common symbolic name. As will be seen, bytes 2-21 are used to hold the port type, bytes 22-23 the slot number, and bytes 24-25 the sub-slot number. In one embodiment, the first byte is used to hold an optional version number which serves as an identifier for the scheme used to store the attributes within the symbolic name field. More detail on how the version number is used will be provided below.

Figure 4:
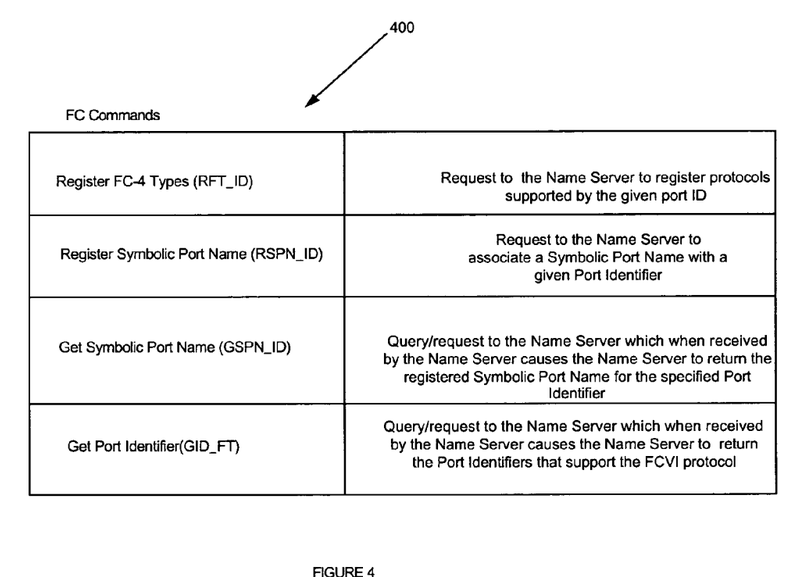
FIG. 4 shows a table of Fibre Channel (FC) commands that may be used to implement aspects of the present invention.

Referring again to FIG. 2 of the drawings, at block 202 the common name to port assignment is stored within the name server 106A for the fabric 106. In order to perform the operation 202, each port NP1 and NP2 is configured to issue the RSPN_ID command shown in FIG. 4 of the drawings, wherein a Table 400 of Fibre Channel (FC) commands that may be used to implement aspects of the present invention is provided. The RSPN_ID command is a request to the name server 106A to associate a symbolic name with a given port ID.

Figure 5:
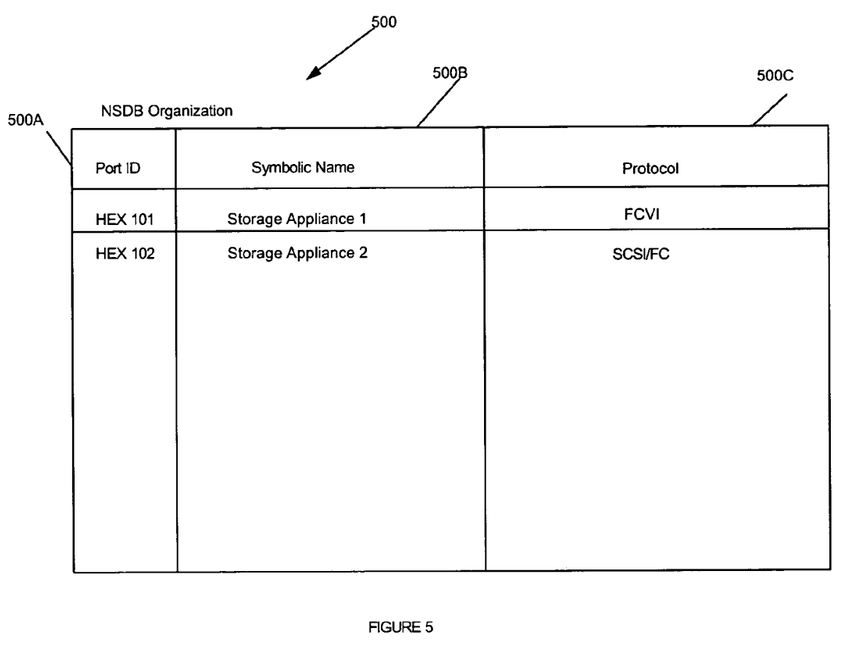
FIG. 5 shows a table implemented within a name server, in accordance with one embodiment of the present invention.

FIG. 5 of the drawings provides a Table 500 which shows how information is organized within the NSDB of the name server 106A. As will be seen the Table 500 stores a mapping of a port identifier (ID) 500A, to a symbolic name 500B, and to a ULP protocol 500C. In on embodiment, the ports NP1, NP2, are configured to register the protocols that they each support using the RFT_ID command shown in FIG. 4. Thus, the name server 106A has the information required to populate the column 500C. The Table 500 may be queried by using the symbolic name as a key to establish the port ID assigned to the ports NP1, and NP2.

Referring again to FIG. 2 of the drawings, at block 204, each port in the pair of ports NP1, NP2 is configured to query the name server 106A to establish an identity (defined in terms of a port ID) for the other port in the pair based on the common name. For example, each of the ports NP1, and NP2 may be configured to issue the GID_FT command to the name server 106A (see FIG. 4 of the drawings). In response to the GID_FT, the name server 106A returns the port identifier of all ports that support the FCVI protocol. The ports, NP1, and NP2 then issue the GSPN_ID command (See FIG. 4) to the name server 106A. This command causes the name server 106A to return the registered symbolic name for the specified port identifier. If the registered symbolic name received from the name server 106A matches a ports own symbolic name then the port ID of the port with the matching symbolic name is selected as a login port.

At block 206, a FCVI link is created between the pair of ports NP1, and NP2, wherein NP1 is used as the login port of NP2, and NP2 is used as the login port of NP1. This is performed in one embodiment, wherein the port NP1 (the source port) logs in directly with the port NP2 (the login port), and the port NP2 (the source port) logs in directly with the port NP1 (the login port).

Figure 6:
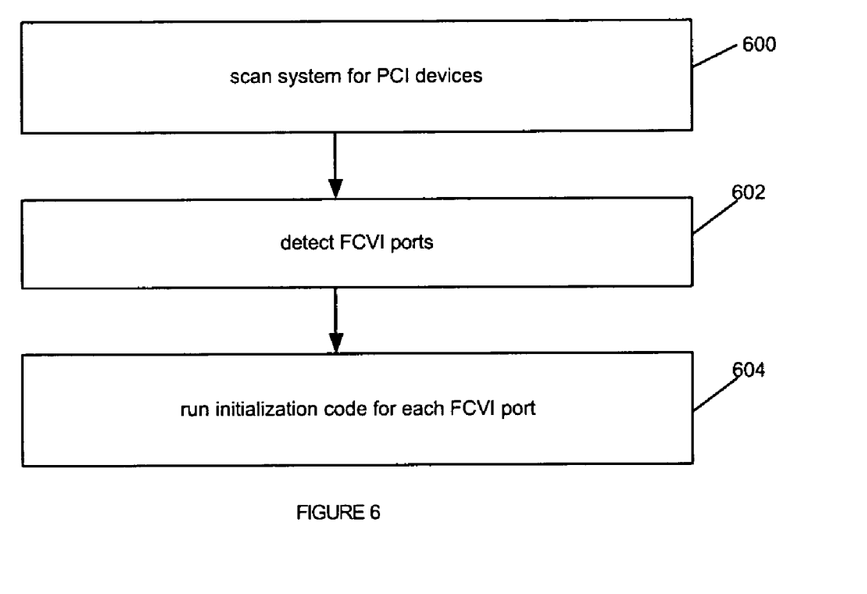
FIG. 6 shows a flowchart of operations performed by a operating system in order to configure a N_Port, in accordance with one embodiment of the invention.
Figure 7:
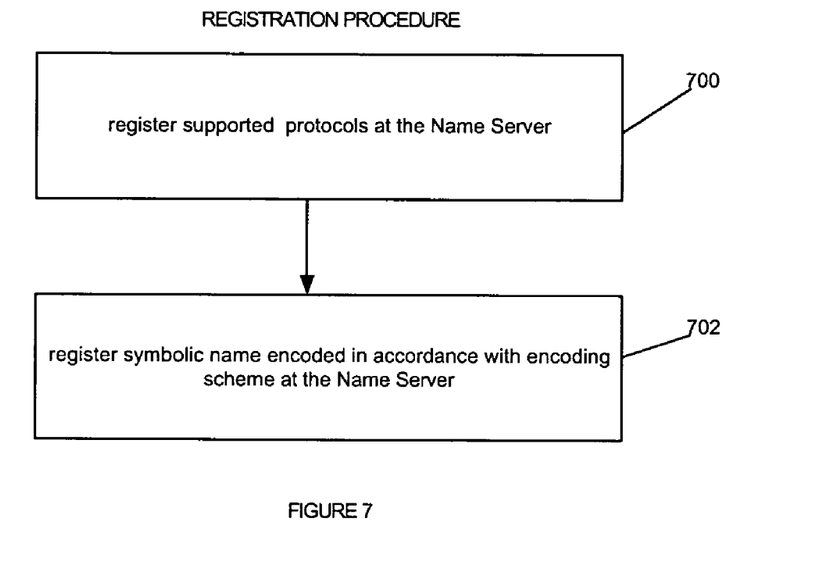
FIG. 7 shows a flowchart of a registration procedure performed in order to register a N_Port in accordance with one embodiment of the present invention.

The operations 200, and 202 shown in FIG. 2 of the drawings may be performed by the procedure shown in FIG. 6 of the drawings. Referring to FIG. 6 at block 600 operating systems for the storage devices 102, and 104 scans for PCI devices. Thereafter at block 602, the operating system detects all FCVI ports. Thus, at block 602, the operating system for the storage device 102 will detect the port NP1, and the operating system for the storage device 104 will detect the port NP2. In one embodiment, the detection at block 602 is performed by reading hard coded information located in non-volatile memory for the ports NP1, and NP2. The operations at block 602 also include automatically detecting the PCI slot and sub-slot numbers for the detected FCVI ports. At block 606, the operating systems for the storage devices 102 and 104 run initialization code to initialize the ports NP1 and NP2. The initialization code includes routines to create the common symbolic name described above and to encode the symbolic name within the symbolic name field for each port. The initialization code includes a routine to perform the registration procedure shown in FIG. 7. Referring to FIG. 7 at block 700, an operation is performed to register the protocols supported by a port at the name server 106A. This operation includes issuing the RFT_ID described above. Thereafter at block 702, an operation is performed to register the symbolic name for the port, at the name server 106A. This is achieved by issuing the RSPN_IP command to the name server 106A, as described above.

Figure 8:
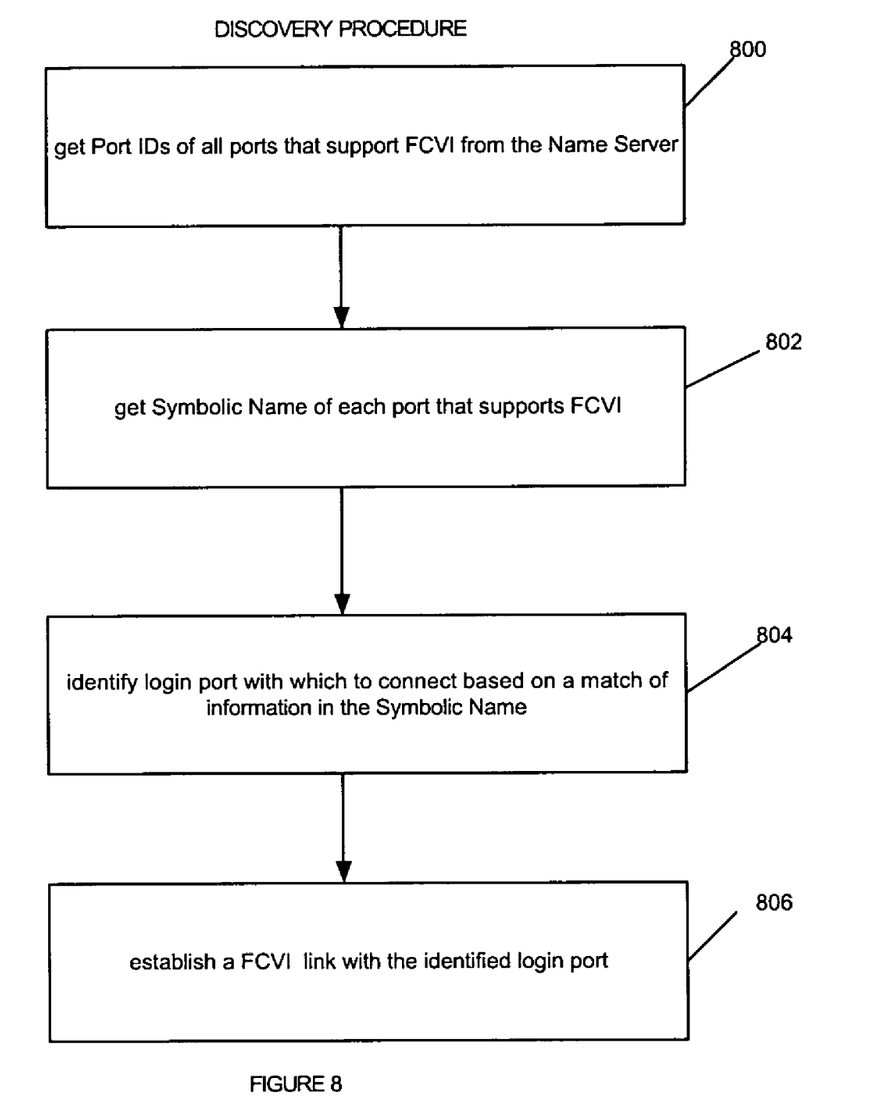
FIG. 8 shows a flowchart of a discovery procedure performed in order to discover an identity of a login port, in accordance with one embodiment of the invention.

The initialization code also includes a routine to perform the discovery procedure shown in FIG. 8 of the drawings. The discovery procedure shown in FIG. 8 is performed by each of the ports NP1, and NP2. Starting at block 800, the ports NP1 and NP2 get the port ID's of all ports that support the FCVI protocol from the name server 106A. The operation performed at block 800 includes issuing the Get Port Identifier (GID_FT) shown in FIG. 4 to the name server 106A. At block 802, the ports NP1, and NP2 issue the Get Symbolic Port Name (GSPN_ID) shown in FIG. 4 to the name server 106A. This command causes the name server 106A to return the symbolic name of each port that supports the FCVI protocol to the ports NP1, and NP2. At block 802, the ports NP1, and NP2 identify each other as a login port with which to perform a login operation based on a match of the respective symbolic names. Thereafter at block 806, the ports NP1, and NP2 establish a FCVI link with each other by performing a direct login operation.

The version number (see FIG. 3) is used as a mechanism to identify the encoding scheme used to encode the port type, and PCI slot/sub-slot numbers within the symbolic name. In one embodiment, an N_Port may be configured to login with another N_Port that has the same version number in its symbolic name.

Figure 9:
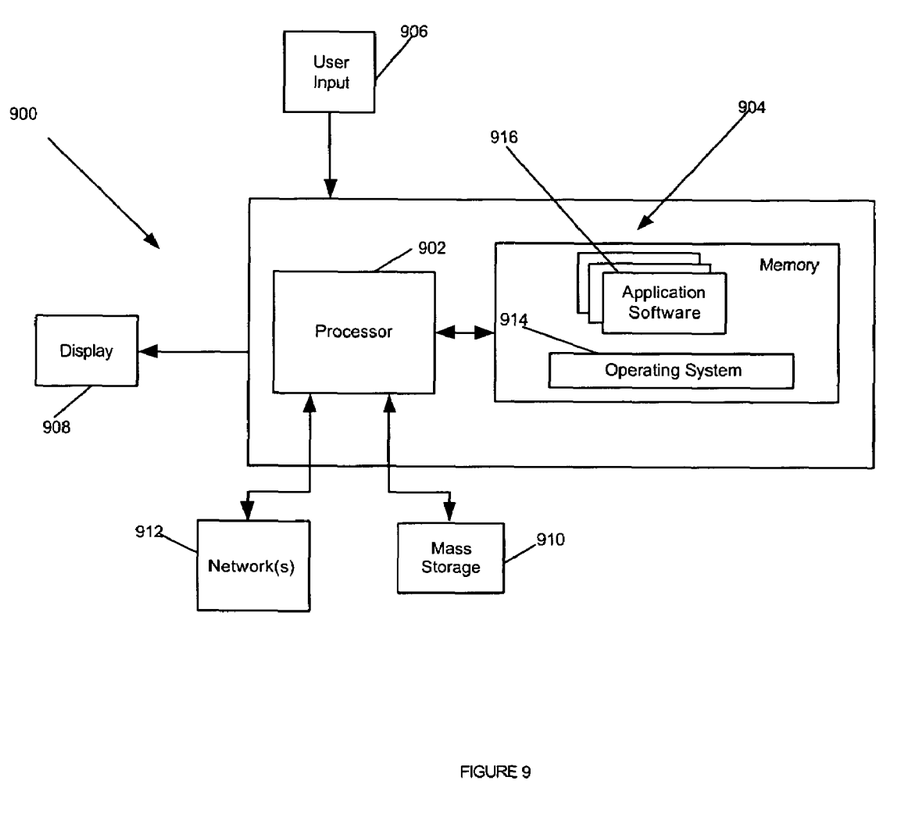
FIG. 9 shows a high-level block diagram of hardware that may be used to implement the storage devices of the present invention.

Referring to FIG. 9 of the drawings, reference numeral 900 generally indicates hardware that may be used to implement the storage devices 102 and 106, in accordance with one embodiment. The hardware 900 typically includes at least one processor 902 coupled to a memory 904. The processor 902 may represent one or more processors (e.g., microprocessors), and the memory 904 may represent random access memory (RAM) devices comprising a main storage of the hardware 900, as well as any supplemental levels of memory e.g., cache memories, non-volatile or back-up memories (e.g. programmable or flash memories), read-only memories, etc. In addition, the memory 904 may be considered to include memory storage physically located elsewhere in the hardware 900, e.g. any cache memory in the processor 902, as well as any storage capacity used as a virtual memory, e.g., as stored on a mass storage device 910.

The hardware 900 also typically receives a number of inputs and outputs for communicating information externally. For interface with a user or operator, the hardware 900 may include one or more user input devices 906 (e.g., a keyboard, a mouse, etc.) and a display 908 (e.g., a Cathode Ray Tube (CRT) monitor, a Liquid Crystal Display (LCD) panel).

For additional storage, the hardware 900 may also include one or more mass storage devices 910, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 900 may include an interface with one or more networks 912 (e.g., a local area network (LAN), a wide area network (WAN), a wireless network, and/or the Internet among others) to permit the communication of information with other computers coupled to the networks. It should be appreciated that the hardware 900 typically includes suitable analog and/or digital interfaces between the processor 902 and each of the components 904, 906, 908 and 912 as is well known in the art.

The hardware 900 operates under the control of an operating system 914, and executes various computer software applications 916, components, programs, objects, modules, etc. (e.g. a program or module which performs operations described with reference to FIGS. 1 and 8 of the drawings). In one embodiment, the operating system and the software applications may be embodied in a single piece of software. Moreover, various applications, components, programs, objects, etc. may also execute on one or more processors in another computer coupled to the hardware 900 via a network 912, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives and optical disks (e.g., Compact Disk Read-Only Memory (CD ROMS), Digital Versatile Disks, (DVDs), etc.), among others.

The description of the present invention with respect to a SAN architecture is intended to be non-limiting. Thus, for example, the techniques disclosed herein apply equally well to a Network Attached Storage (NAS) device.

What is claimed is:

1. A method for establishing links between Fibre Channel (FC) node devices through a FC fabric without using FC Address Resolution Protocol (FARP), the method comprising:

assigning, by a computer system, a common name to a pair of ports without assigning an IP address to each of the pair of ports, wherein the common name is assigned to each port of the pair of ports, each port in the pair of ports is located on first and second FC node devices, respectively, and the pair of ports includes a source port and a destination port;

storing, by the computer system, the common name-to-port assignment within a name server for the FC fabric;

configuring, by the computer system, the first FC node device to query the name server to obtain an FC address identifier for the port located on the second FC node device based on the common name, and configuring the second FC node device to query the name server to obtain an FC address identifier for the port located on the first FC node device based on the common name; and configuring, by the computer system, the first FC node device to create a link between the pair of ports using the FC address identifier for the second FC node device, and configuring the second FC node device to create a link between the pair of ports using the FC address identifier for the first FC node device.

2. The method of claim 1, wherein assigning the common name comprises automatically deriving the common name based on attributes of the pair of ports.

3. The method of claim 2, wherein automatically deriving the common name comprises:
   detecting a port type, a slot number, and a sub-slot number for the pair of ports; and
   combining the port type, the slot number and the sub-slot number for the common name.

4. The method of claim 3, storing the common name-to-port assignment within the name server for the FC fabric comprising storing the common name within at least a portion of a symbolic name for each port, as defined in the FC protocol.

5. The method of claim 4, wherein storing the common name-to-port assignment within the name server comprises configuring each port to register the common name as a symbolic name with the name server.

6. A method for creating links between Fibre Channel (FC) node devices through a FC fabric without using FC Address Resolution Protocol (FARP), the method comprising:
   assigning, by a computer system, a symbolic name to a plurality of FC ports without assigning an IP address to each of the pair of ports, wherein the symbolic name is assigned to each FC port of the plurality of FC ports, each FC port is located on a different FC node device, each symbolic name is a combination of a plurality of attributes of a corresponding FC port, and the plurality of attributes are selected from the group consisting of a port type, a slot number for each FC port, and a sub-slot number for each FC port;
   configuring, by the computer system, each FC port to register its symbolic name as a symbolic port name with a name server for the FC fabric;
   configuring, by the computer system, each FC port to query the name server to find a FC address identifier of another FC port based on the symbolic name of the another FC port; and
   configuring, by the computer system, each FC port to login to the another FC port using the FC address identifier.

7. The method of claim 6, wherein the plurality of attributes are automatically detected by an operating system for the FC node device.

8. The method of claim 7, wherein assigning the symbolic name comprises storing the symbolic name at a predefined location within a symbolic name field for each port, as defined in the FC protocol.

9. A computer readable medium, having stored thereon a sequence of instructions which when executed by a processor, cause the processor to perform a method for establishing a link from a first Fibre Channel (FC) port to a second FC port through a FC fabric without using FC Address Resolution Protocol (FARP), the method comprising:
   querying a name server for the FC fabric to obtain a FC address identifier for the second port, based on a match of a symbolic name of the first FC port and a symbolic name of the second FC port without using an IP address assigned to the second FC port, wherein the match occurs when the symbolic name of the first FC port is equal to the symbolic name of the second FC port, the first and second FC ports are located on first and second FC node devices, respectively, and the symbolic names are stored within the name server; and
   creating the link from the first FC port to the second FC port using the obtained FC address identifier for the second FC port.

10. The computer readable medium of claim 9, wherein the symbolic names stored within the name server are automatically derived based on attributes of the first and second FC ports.

11. The computer readable medium of claim 10, wherein the attributes comprise a port-type, a slot number, and a sub-slot number for the first and second FC ports.

12. A computer readable medium having stored thereon a sequence of instructions which when executed by a processor, cause the processor to perform a method for creating links between a first Fibre Channel (FC) port and a second FC port through a FC fabric without using FC Address Resolution Protocol (FARP), the method comprising:
   querying a name server for the FC fabric to obtain symbolic names of other FC ports on the FC fabric that support an upper-level protocol (ULP) supported by the first FC port without using an IP address assigned to the second FC port, wherein each symbolic name is derived based on port type and PCI address of a corresponding FC port and registered within a symbolic name field in a database for the name server by a FC node device having the corresponding FC port;
   comparing each of the symbolic names obtained from the name server with a symbolic name for the first FC port to find a match, wherein the match occurs when the symbolic name for the first FC port is equal to a symbolic name of the obtained symbolic names; and
   performing a port login using a port identifier of the second FC port wherein the symbolic name for the second FC port has the match with the symbolic name for the first FC port.

13. The computer readable medium of claim 12, wherein the upper-level protocol is the Fibre Channel Virtual Interface (FCVI) protocol.

14. A storage system comprising:
   a processor;
   a network adapter, coupled to the processor, to connect the storage system to a Fibre Channel (FC) fabric; and
   a memory, coupled to the processor, to store instructions which when executed by the processor cause the processor to perform a method for creating a link between a first FC port and a second FC port through a FC fabric without using FC Address Resolution Protocol (FARP), the method comprising:
   querying a name server for the FC fabric to obtain symbolic names for FC ports in other storage systems on the FC fabric without using an IP address assigned to the second FC port, wherein each symbolic name is derived based on port type and PCI address of a corresponding FC port and registered within a symbolic name field in a database for the name server by a storage system which has the corresponding FC port;
   comparing each of the symbolic names obtained from the name server with a symbolic name for the first FC port to find a match, wherein the match occurs when the symbolic name for the first FC port is equal to a symbolic name of the obtained symbolic names; and
   performing a port login using a port identifier of the second FC port wherein the symbolic name for the second FC port has the match with the symbolic name for the first FC port.

15. The storage system of claim 14, wherein the symbolic names stored in the name server are automatically derived based on a plurality of attributes of the first and second FC ports.

16. A method for creating a link from a first Fibre Channel (FC) node device to a second FC node device on a FC fabric having a name server for the FC fabric without using FC Address Resolution Protocol (FARP), the method comprising:

querying the name server to retrieve a plurality of values of a symbolic name field within a name server database for the name server without using an IP address assigned to the second FC node device;

searching the plurality of values received from the name server to find a match with a version number and a combination of a plurality of attributes of the second FC node device, wherein the plurality of attributes are selected from the group consisting of a port type, a slot number and a sub-slot number for each port in the second FC node device, the version number identifies an encoding process used to encode the combination of the plurality of attributes, and the match occurs when the version number and the combination of the plurality of attributes of the second FC node device are found from the received plurality of values;

obtaining a FC address identifier for the second FC node device from the name server based on the match with the version number and the combination of the plurality of attributes of the second FC node device; and     creating the link from the first FC node device using the FC address identifier for the second FC node device.

17. The method of claim 16, wherein the combination of the plurality of attributes are registered with the name server as a symbolic name by the second FC node device.

18. The method of claim 17, wherein the plurality of attributes are automatically detected and combined for the combination by an operating system for the second FC node device.

19. The method of claim 16, wherein the combination is stored at a predefined location within a symbolic name field for each port, as defined in the FC protocol, in the name server database.

* * * * *